United States Patent [19]
Galvagni et al.

[11] Patent Number: 5,394,295
[45] Date of Patent: Feb. 28, 1995

[54] MANUFACTURING METHOD FOR SOLID STATE CAPACITOR AND RESULTING CAPACITOR

[75] Inventors: John Galvagni, Surfside Beach; Sonja Brown, Myrtle Beach; Kevin Christian, Myrtle Beach; Yong-Jian Qui, Myrtle Beach, all of S.C.

[73] Assignee: AVX Corporation, Del.

[21] Appl. No.: 68,150

[22] Filed: May 28, 1993

[51] Int. Cl.⁶ .................................... H01G 1/005
[52] U.S. Cl. ......................... 361/303; 29/25.03; 29/25.42; 361/528; 361/541; 361/328
[58] Field of Search ............... 29/25.03, 25.42; 361/303, 306.1, 308.1, 308.2, 309, 310, 328, 329, 330, 528, 529, 532, 533, 535, 538, 539, 540, 541

[56] References Cited

U.S. PATENT DOCUMENTS

| | | |
|---|---|---|
| 3,335,073 | 4/1967 | Dunn . |
| 3,398,067 | 8/1968 | Raffalovich . |
| 3,412,444 | 11/1968 | Klein ................... 361/529 |
| 3,458,916 | 8/1969 | Klein ................... 29/25.42 |
| 3,465,426 | 9/1969 | Baier et al. ........... 29/25.03 |
| 4,059,887 | 11/1977 | Galvagni . |
| 4,188,706 | 2/1980 | Millard et al. ........ 29/25.03 |
| 4,450,049 | 5/1984 | Nakata et al. . |
| 4,520,430 | 5/1985 | Long et al. . |
| 4,541,904 | 9/1985 | Luder et al. . |
| 4,599,788 | 7/1986 | Love et al. ........... 29/25.03 |
| 4,780,796 | 10/1988 | Fukuda et al. . |
| 4,945,452 | 7/1990 | Sturmer et al. . |
| 5,198,968 | 3/1993 | Galvagni .............. 362/529 |

Primary Examiner—Bruce A. Reynolds
Assistant Examiner—Gregory L. Mills
Attorney, Agent, or Firm—Mark T. Basseches

[57] ABSTRACT

A method of manufacturing solid state capacitors involves providing an elongate band of solid state forming metal, folding the band into a trough-like U-shaped configuration, introducing a layer of solid state metal powder into the trough, sintering the powdered metal to thereby bond the metal to the foil, partially severing the foil and sintered powder to define a multiplicity of individual units which are thereafter processed to convert the units into capacitors by sequential dielectric forming and counterelectrode depositing steps. The individual capacitors are terminated and preferably also may be tested while still interconnected by portions of the foil, following which individual capacitors are separated by cuts which register with the initial cuts which defined the individual units. The disclosure further teaches a novel solid state capacitor fabricated in accordance with the method, the capacitor exhibiting high volumetric efficiency and being particularly adapted for surface mounting.

18 Claims, 2 Drawing Sheets

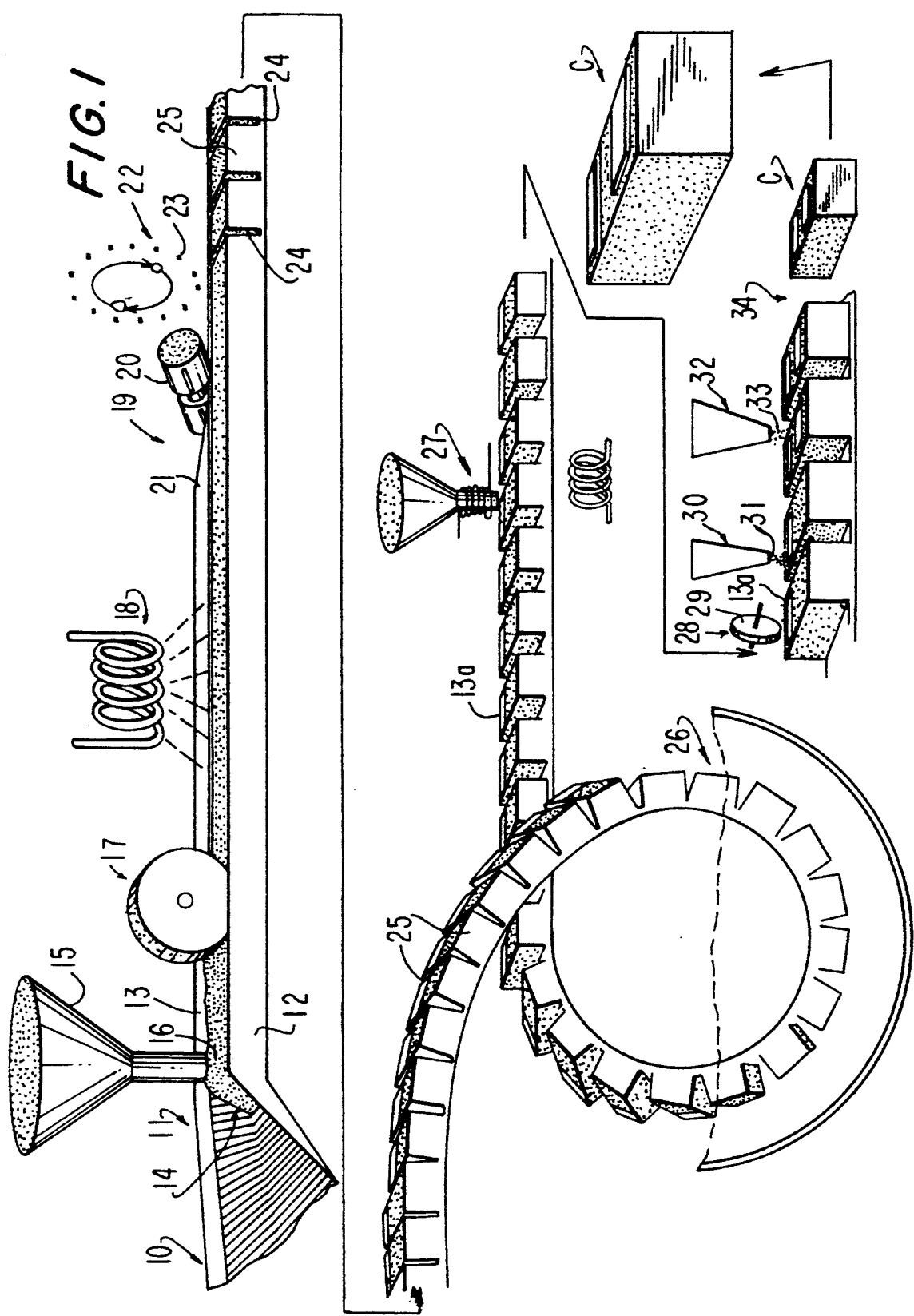

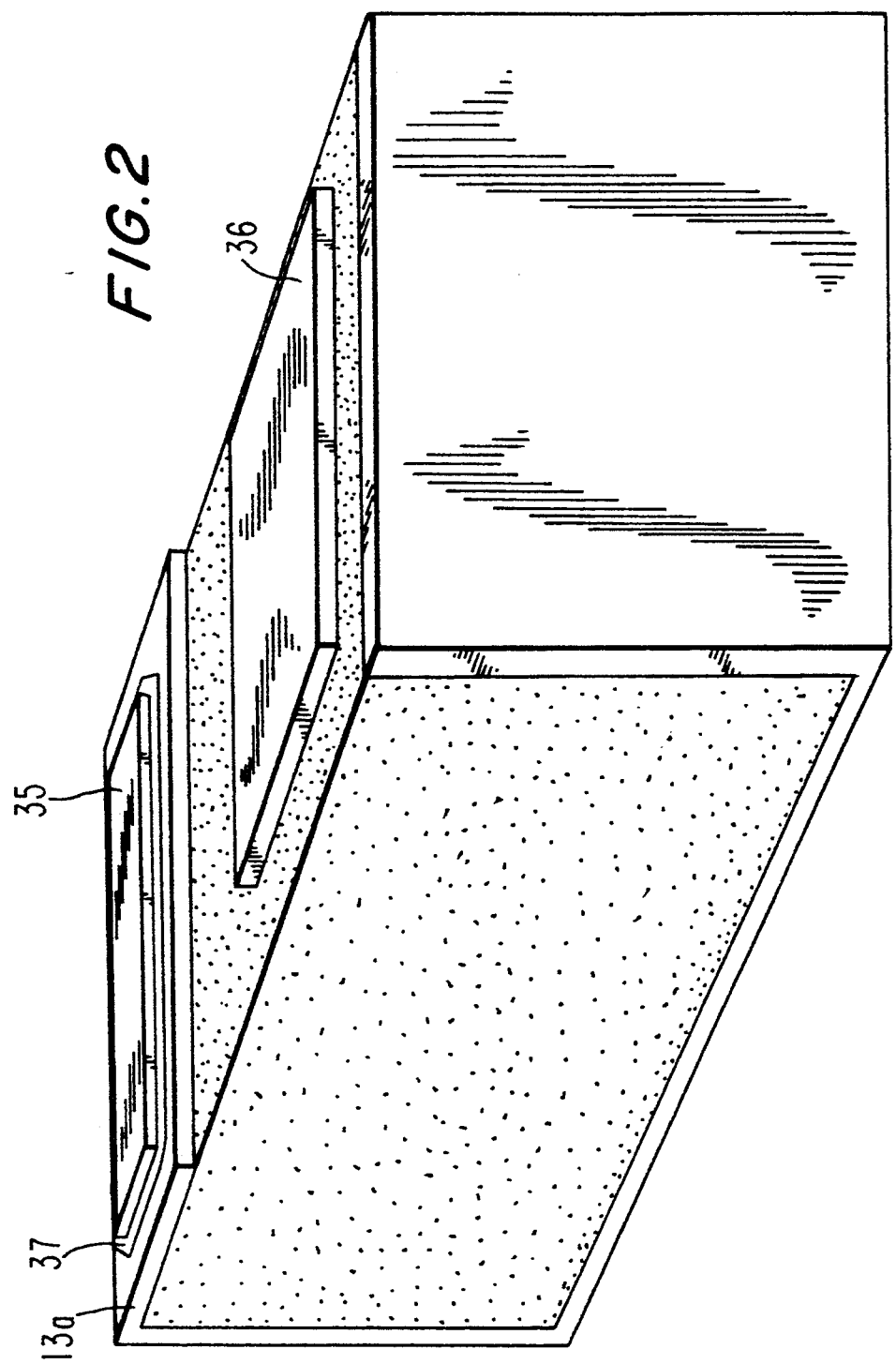

MANUFACTURING METHOD FOR SOLID STATE CAPACITOR AND RESULTING CAPACITOR

BACKGROUND OF THE INVENTION

The present invention is directed to a method of manufacturing solid state capacitors and to the resultant capacitor which is especially adapted but is not limited to surface mounting.

More particularly, the invention is directed to a method of manufacturing solid state capacitors from the so-called solid state forming metals. The primary commercially employed solid state forming metals include tantalum and niobium. It is to be understood however that the term solid state metals should be deemed to include one or more of such additional metals as molybdenum, aluminum, titanium and tungsten, which are formable into foils and which may be oxidized to provide a dielectric layer.

PRIOR ART

Solid state capacitors, and particularly tantalum capacitors, are valued due in part to their ability to provide extremely high capacitances within small volumetric spaces. As pointed out in U.S. Pat. No. 5,198,968, assigned to the assignee of the instant application, conventional tantalum capacitors such as are described and illustrated in U.S. Pat. Nos. 4,059,887; 4,520,430; 4,780,796 and 4,945,452, compromise to a great degree, the volumetric capacitive efficiency of the solid state capacitor by requiring relatively bulky termination and encapsulation components. Importantly, the fabrication of such tantalum devices is complicated by the inherent difficulty in processing tantalum and like solid state forming metals.

Conventional fabricating procedures include the steps of providing metered quantities of finely divided tantalum powder and compressing the powder to form a pellet. The pellet is sintered to form a porous integral mass of tantalum metal, the sintering step being carried out either before or after a tantalum anode is bonded to the tantalum pellet. Where the rod is embedded in the tantalum pellet prior to sintering and the rod and pellet co-sintered, great care must be taken to assure formation of a reliable mechanical and electrical bond between the anode rod and sintered tantalum. Welding of the rod to the sintered pellet presents other fabricating difficulties, since solid state forming metals, and particularly tantalum, are difficult to weld in a manner which defines a reliable bond.

The fabricating steps following bonding of the anode rod to the tantalum pellet are conventional and include anodizing to form dielectric coating over and within the porous mass and the subsequent deposition over the dielectric of a conductive counter-electrode coating defining the cathode of the capacitor. It is conventional practice for the various processing steps to be carried out while the capacitor is supported by the anode rod. The handling of the capacitor preforms by the anode rod results in a significant loss due to breakage of the fragile connection between anode rod and sintered pellet.

The above referenced U.S. Pat. No. 5,198,968 represents an improved method of forming tantalum capacitors and an improved resultant surface mountable capacitor by extruding a tantalum tube, filling the tube with tantalum powder, and sintering the powder in situ to also bond the powder to the tube. The resultant preform is conventionally anodized, formed with a counter-electrode, and terminated.

A difficulty inhering in all prior art manufacturing methods of solid state capacitors, including that of U.S. Pat. No. 5,198,968, resides in the necessity for individually handling the capacitor preforms during anodizing counter-electrode formation etc. The difficulties of the "handling" problem is put into perspective when it is recognized that the capacitor preforms are often of only a few millimeters in size in their largest dimension.

The following U.S. patents were located in the course of a prior art search conducted in respect of the instant invention:

U.S. Pat. No. 3,335,073 relates to a method of reducing the number of flaws in the dielectric coating of a tantalum foil by producing an amorphous tantalum oxide film on the foil before cold rolling the foil to its final thickness.

U.S. Pat. No. 3,398,067 relates to forming a tantalum capacitor by depositing tantalum on a substrate, anodizing, and thereafter aging the deposited layer in air. The noted steps are following by a further anodizing step and depositing conductive material on the surface of the oxide.

U.S. Pat. No. 4,450,049 discloses a tantalum capacitor said to have improved breakdown voltage, the improvement resulting from following a first conventional anodizing step by a further anodizing in a fused salt, such a sodium nitrate.

U.S. Pat. No. 4,541,904 relates to a moisture sensor formed by providing a high porosity and, hence, moisture absorptive tantalum oxide layer on an insulating substrate. Porosity is achieved by sputtering the tantalum on to the substrate. Oxidation may be effected during or after the sputtering step.

SUMMARY OF THE INVENTION

The present invention may be summarized as directed to an improved method of manufacturing tantalum and like solid state capacitors and the resulting capacitor.

Briefly stated, the instant method greatly facilitates the formation of solid state capacitors by providing an elongate tantalum (for example) foil strip, which is subsequently bent to a U-shaped configuration, at least partially filling the trough formed as a result of folding the foil with tantalum powder, leveling the powder and subjecting the powder and foil to sintering temperatures whereby the powder is formed into a porous sintered mass, which is bonded to the mass-engaging portions of the foil.

The continuous length of foil and sintered tantalum is thereafter subjected to sequential cutting steps which sever the upstanding legs of the U configuration and the sintered tantalum mass to a level proximate or partially penetrating the base of the U whereby the composite is divided into a multiplicity of individual units flexibly linked by the unsevered portions of the foil. The still connected units are thereafter conventionally processed, i.e. by one or more anodizing steps and counter-electrode forming steps. Preferably, the trough formed by the initial foil bending step includes one U-shaped leg which is longer than the other, the elongated leg, after sintering, and before further processing being folded into overlapping contact with the sintered tantalum mass. The thus formed individual and still connected capacitors are terminated, the anode termination being preferably formed to the overlapping foil component, the exposed or uppermost surface of which must first be cleared of dielectric. The cathode termination is effected to the exposed upper surface of the counterelectrode in proximate spaced relation to the anode termination. Following termination steps, the completed capacitors are separated by a further cutting step through the foil components linking the capacitor at areas in registry with the first formed cuts.

As will be appreciated from the foregoing, the processing and fabrication of the tantalum or like solid state capacitors is greatly facilitated since at all times prior the final separating step, processing is effected on a continuously linked series of capacitor preforms, eliminating the necessity for individually handling capacitor preforms during the various processing steps.

It is accordingly an object of the invention to provide an improved method of forming solid state capacitors.

A further object of the invention is the provision of a method of forming solid state capacitors by a method whereby the individual capacitor preforms are continuously linked during the entire sequence of processing steps.

Still a further object of the invention is the provision of an improved method of manufacturing solid state capacitors wherein an elongate tape or band formed of a foil of the metal from which the capacitor is to be fabricated is shaped as a container or carrier for the pulverent solid state forming material through the entirety of the processing steps, i.e. from sintering to termination, whereby the handling of the materials during capacitor formation is greatly facilitated.

Still a further objection of the invention is the provision of the process wherein the carrier foil also functions as the anode for the capacitor.

Still a further object of the invention is the provision an improved, volumetrically efficient solid state capacitor especially adapted for use as a surface mountable capacitor.

BRIEF DESCRIPTION OF DRAWINGS

FIG. 1 is a schematic perspective representation of the fabricating steps in accordance with the invention.

FIG. 2 is an enlarged perspective view of a finished capacitor in accordance with the invention.

DETAILED DESCRIPTION OF DRAWINGS

Referring now to FIG. 1, there is schematically illustrated the operating sequence of the process of the invention. A tantalum foil 10 from a bulk supply (not shown) is folded a station 11 from an initial flatwise condition into a U-shaped or through-like configuration which includes a first upstanding leg 12, and a second upstanding leg 13, projecting generally at right angles to a central base portion 14 of the foil. Preferably, the leg 13 is longer than the leg 12 for reasons which will appear hereafter.

Numeral 15 schematically represents a filling station from which tantalum or like pulverant solid state forming metal 16 is dispensed in metered manner onto the advancing foil strip. At 17 there is symbolically displayed a roller, doctor blade or like leveling device which functions to tamp and level the deposited pulverant material at a level at or slightly below the uppermost surface of wall 12 and below the surface of the taller wall 13 of the trough.

At 18 there is disclosed a sintering station whereat the tamped pulverant powders are sintered so as to form the powder into a sintered porous mass, the heating step also reliably bonding both mechanically and electrically the foil engaging surfaces of the sintered mass to the complemental foil surfaces.

It is to be appreciated that while the schematic view of FIG. 1 discloses the treatment steps as a single continuous process, in practice elongate foil sections would be processed by each of the illustrated mechanisms individually and set aside for subsequent processing, since obviously the treatment time inhering in each of the steps is likely to differ. By way of illustration, an elongate foil section may be bent, filled, and tamped, and thereafter removed for subsequent processing through the sintering station, or a number of filled sections may be simultaneously sintered in a sintering oven.

The sintered composite emerging from station 18, is thereafter passed through a further folding station 19 at which roller 20 forms the lip portion 21 of branch 13 downwardly against the uppermost surface of the sintered material to provide an overlying lip which will ultimately form the anode terminal connection of the capacitor.

There is next provided a cutting station 22 whereat cutting wheel 23 forms transverse cuts 24, the cuts being formed to a depth which is immediately proximate to or partially scores, but does not sever the foil base 14.

The discrete capacitor preform units 25 emerging from the cutting station are thereafter subjected to conventional processing steps including one or more dielectric forming steps at anodizing station 26 followed by application of counterelectrode at electroding station 27. As is well known, the counterelectroding process, where effected by a process of dipping in a solution of manganous nitrate and subsequent heating in moist environment to convert the nitrate to a solid manganese dioxide, must be repeated a number of times in order to build-up a desired thickness. In such case, it is normally necessary to repeat the dielectric reformation step in order to heal damages caused during formation of the counterelectrode and insure against short circuit formations within the capacitor. Alternate counterelectrode forming methods may be employed, i.e. using impregnation of low viscosity conductive polymers.

The processed capacitor elements are terminated by passing the same through a buffing or cleaning station 28 whereat a sand blasting device or a polishing wheel 29 removes any residue of counterelectrode material and importantly any dielectric coating remaining, from the surface of the folded over lip portions 13a of the wall 13.

Fabrication of the capacitors is completed by the deposit at station 30 of conductive termination material 31 over the cleaned portion of lip 13a and the concomitant deposit at station 32 of termination material 33 over exposed portions of the counterelectrode area.

The final manufacturing step is effected at station 34, the step involving a separation of individual capacitors C by a sawing or like severing process from the continuous band.

The finished capacitor is schematically illustrated in FIG. 2 and includes anode termination 35 as deposited at station 30, and cathode termination 36 as deposited at station 32. Since both of terminations 35 and 36 are disposed on the upper face of the capacitor, it will be appreciated that the surface mounting of the capacitor on a PC board may be readily effected by aligning the terminations with appropriate contacts on the surface of the board. It is to be appreciated that the utility of the process is not limited to the fabrication of surface mount capacitors, since obviously extended leads may be applied to the terminations 35,36 and the body of the capacitor may be encapsulated in epoxy or other appropriate non-conductive polymer.

BRIEF DESCRIPTION OF PROCESS DETAILS

The processing methods for forming capacitors from powdered solid state metals are generally well known and the details thereof will be recited herein only briefly. Moreover, the recited dimensions, times and temperatures are subject to substantial variations, the specific values being recited herein in a non-limitative sense for purposes of compliance with the "best mode" provisions of the patent laws.

An elongate band of tantalum foil of between 3 and 5 mils thick and of approximately 250 mils width is preferably first roughened on its upper surface. The foil is bent into the U-shaped configuration previously described with a first leg of about 50 mils in height and a second leg of about 80 mils in height leaving a bottom or base of approximately 120 mils in width.

The U-shaped channel is progressively filled with a quantity of tantalum powder and leveled as by a roller substantially to the height of the shorter leg or slightly higher. Sintering is effected either by advancing the filled channel through a linear inert gas furnace heated to about 1500 degrees C. for a time sufficient to effect sintering, or by cutting the channel into elongate strips and sintering the strips in a conventional vacuum sintering furnace.

Following sintering, the longer leg 13 is folded over the sintered mass and flattened against it, the exposed upper surface of the folded over lip portion 21 ultimately providing the termination surface 13a for the anode of the capacitor. After folding the lip 21, lengths of tantalum channel are cut with a diamond blade into segments of about 60 mils width. Obviously, the longitudinal extent of the respective units 25 may be varied in accordance with the desired capacitance of the finished device.

An important feature of the concept is to effect the cut to a depth that the base of the tantalum foil is left essentially intact, whereby the units of the cut strip are both electrically and mechanically interconnected. The connection permits of significant flexing of the strip due to the fact the sole component linking the units is the base of the foil.

Formation of the dielectric layer is essentially conventional and is effected by an electrochemical process, illustratively immersion of the units in a 0.01 percent phosphoric acid solution heated to approximately 85 degrees C. with the tantalum foil biased to a voltage of between 25 and 300 volts (dependent upon the desired thickness of dielectric coating), a cathode being disposed in the solution to complete the circuit. The pentoxide dielectric is rinsed in deionized water and dried.

The usually commercially accepted process for forming counterelectrode involves dipping the units in a manganous nitrate solution and pyrolitically converting the adherent solution to solid manganese dioxide by heating the device in a moist atmosphere to about 325 degrees C. The process is repeated a number of times to build up the desired counterelectrode thickness. As is also well known, the device may be subjected to further anodizing to heal possible damages to the dielectric coating caused as a result of heating in the course of counterelectrode formation.

In accordance with an alternate means of counterelectrode formation, conductive polymers may be employed as counterelectrode materials. By way of example and without limitation, a satisfactory polymer tetracyanoquinodimethane salts, may be employed for such purpose, reference in this regard being made to U.S. Pat. No. 4,580,855. In the use of the TCNQ salts, application of the counterelectrode is effected by heating the units from the bottom and applying a molten polymer through a heated syringe.

Termination of the completed capacitor to enable connection in a circuit is effected by abrading portions of the upper surface 13a to remove any counterelectrode and intervening dielectric formed in the course of anodizing to provide an exposed area 37 of tantalum foil. The abrading may be effected either through a small wheel, as shown illustratively by the reference numeral 29, or preferably through the use of a small sandblasting device. Chemical etching is an alternate means for providing a clean adherent surface.

Anode termination 35 is applied either by welding or by sputter metalization with layers of one or more of chrome, nickel and silver. The negative termination may also be sputtered or may be applied by a painted on layer of a suspension of graphite particles in aqueous ammonia followed, after drying, by a silver paint.

Desirably, the finished capacitors are tested prior to separation of the units, the testing procedures being materially facilitated by the fact that it is possible to move the still connected units relative to contacts sequentially brought into engagement with the capacitor terminals.

Finally, the individual capacitors are separated by a further saw cut, the kerf of this final saw cut being thinner than the kerf initially separating the foil into sub-units. In effecting the final cut, care should be taken to avoid saw penetration widthwise beyond the initial kerf so as to avoid disturbing the dielectric structure with resulting possible short circuiting.

As will be apparent from the preceding description, the invention provides an efficient method for forming tantalum or like solid state capacitors. A primary advance of the method resides in the fact that the capacitors are mutually interconnected throughout essentially the entirety of the manufacturing process, greatly expediting handling of the capacitors, since it is merely necessary to process a relatively large unit rather than individually handling small components.

A further advantage of the procedure is that it enables gang testing of the capacitors, again without handling the capacitors individually.

Still a further advantage resides in the fact that since the tantalum powder is cradled within the trough, the powder need not be compacted to the degree necessary in the formation of conventional capacitors wherein a tantalum pellet must be mechanically joined to an anode rod. By enabling a lower density of tantalum powder, it is possible to built up a thicker dielectric coating and consequent higher working voltage.

The invention further provides an improved capacitor especially adapted for surface mounting, it being noted that the dielectric coating shields the side margins and accordingly the counterelectrode coatings over the side margins expose only the cathode electrode which is normally connected to the ground circuit of an electronic device. It is accordingly feasible to avoid encapsulating the device, although encapsulation is contemplated where required.

As will be apparent to a skilled worker in the art familiarized with the instant disclosure, numerous variations in details of construction and fabrication may be made without departing from the spirit of the invention. Accordingly, the invention is to be broadly construed within the scope of the appended claims.

Having thus described the invention and illustrated its use, what is claimed as new and is desired to be secured by Letters Patent is:

1. The method of manufacturing a solid state capacitor comprising the steps of providing an elongate band of solid state metal foil having parallel side edges, bending said band along a spaced parallel pair of longitudinally extending fold lines to form said band into a U configuration having a base and a spaced pair of upstanding arms, depositing on said fuse a layer of solid state metal powder, thereafter heating said band and powder to sintering temperatures of said powder thereby to integrate said powder into a porous mass bonded to said band, thereafter forming a plurality of longitudinally spaced transversely directed cuts through said arms and sintered mass, said cuts being effected to a depth at least proximate to but not fully penetrating said base of said band to divide said band into discrete units linked by unsevered portions of said base, anodizing said units to form a dielectric coating, applying a counterelectrode over said coating, applying anode and cathode terminations to the foil and counterelectrode components respectively of said units, and thereafter severing said linking portions of said foil in registry with said cuts.

2. A solid state capacitor made in accordance with the method of claim 1.

3. The method in accordance with claim 1 wherein one said upstanding arm is longer than the other said arm, the method including the step of folding portions of said one arm into overlapping relation of said sintered mass prior to said cutting step.

4. A solid state capacitor made in accordance with the method of claim 3.

5. The method in accordance with claim 3 wherein an anode termination connection is effected to said portions of said one arm.

6. A solid state capacitor made in accordance with the method of claim 5.

7. The method in accordance with claim 5 wherein said arms are disposed generally perpendicular to said base and said portions of said one arm are disposed generally parallel to said base.

8. A solid state capacitor made in accordance with the method of claim 7.

9. The method in accordance with claim 7 wherein a termination connection to said counter electrode is disposed in parallel spaced relation to said anode connection.

10. A solid state capacitor made in accordance with the method of claim 9.

11. The method in accordance with claim 1 and including the step of individually testing said units in advance of said step of severing said foil in registry with said cuts.

12. A solid state capacitor made in accordance with the method of claim 11.

13. The method in accordance with claim 1 wherein said solid state metal is selected from the group of metals consisting of one or more of tantalum, niobium, molybdenum, aluminum, titanium and tungsten.

14. A solid state capacitor made in accordance with the method of claim 13.

15. As a new article of manufacture, a preform comprised of a plurality of interconnected solid state capacitors formed by providing an elongate band of solid state metal foil, bending said band parallel to the longitudinal axis of said band to form said band into a trough configuration having a base, introducing into said trough a quantity of solid state metal powder, heating said band and powder for a time and to a temperature sufficient to sinter said powder into a porous mass bonded to said band at the interface of said band and powder, forming a multiplicity of spaced transverse cuts through said mass and portions of said band, said cuts being formed to a depth at least proximate to but not fully penetrating said base to thereby form a series of discrete units linked by portions of said base, anodizing said linked units to provide a dielectric coating, applying a conductive counterelectrode over said coating and applying an anode and a cathode termination to portions of said band and counterelectrode respectively of said units.

16. A capacitor in accordance with claim 15 wherein said trough is generally U-shaped in transverse section including a base and a pair of upstanding arms.

17. A capacitor in accordance with claim 16 wherein portions of one of said arms overlap and engage a surface of said mass remote from and parallel to said base.

18. A solid state capacitor in accordance with claim 15 wherein said solid state metal is selected from the group of metals consisting of one or more of tantalum, niobium, molybdenum, aluminum, titanium and tungsten.

* * * * *